(No Model.)
S. D. STRONG.
POULTRY FEEDING AND WATERING DEVICE.
No. 589,230.  Patented Aug. 31, 1897.
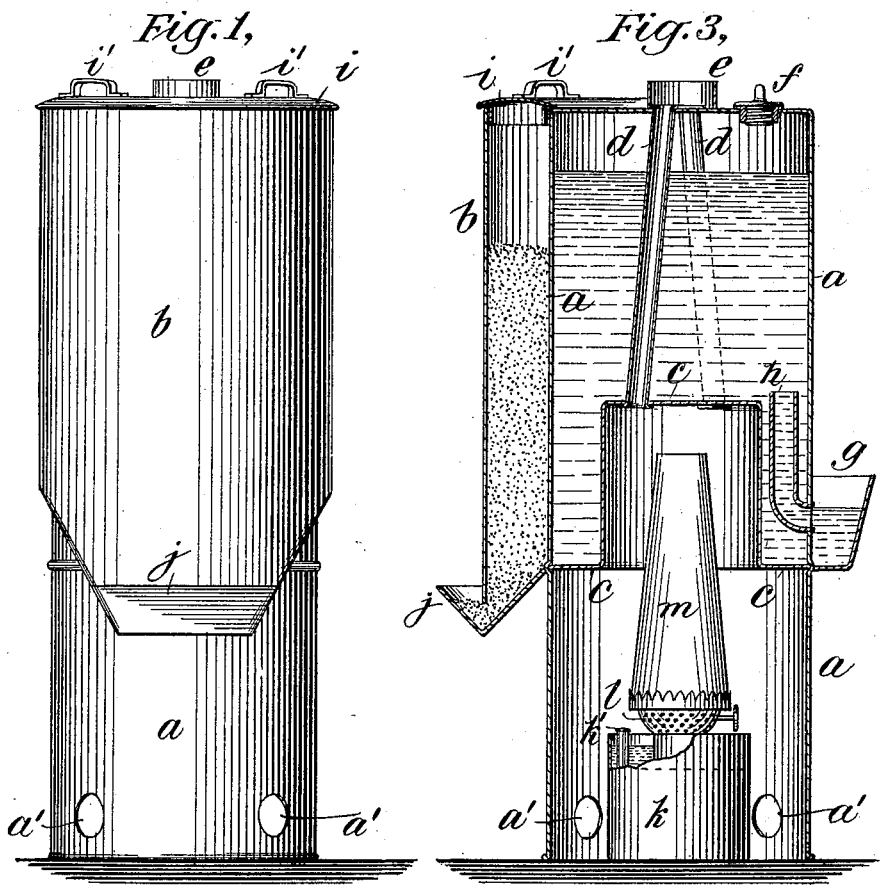
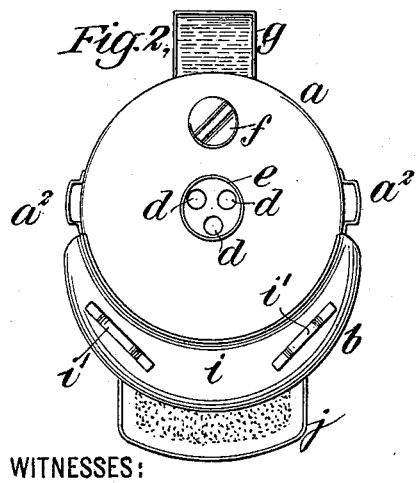
WITNESSES:
INVENTOR
Samuel D. Strong
BY
Henry D. Williams
ATTORNEY

United States Patent Office.

SAMUEL D. STRONG, OF HOMER, MICHIGAN.

POULTRY FEEDING AND WATERING DEVICE.

SPECIFICATION forming part of Letters Patent No. 589,230, dated August 31, 1897.

Application filed January 20, 1896. Serial No. 576,083. (No model.)

*To all whom it may concern:*

Be it known that I, SAMUEL D. STRONG, a citizen of the United States, and a resident of Homer, Calhoun county, State of Michigan, have invented certain new and useful Improvements in Poultry Watering and Feeding Devices, of which the following is a specification, reference being had to the accompanying drawings, forming part hereof.

This invention relates to devices adapted for feeding and watering poultry; and the objects of this invention are to keep the water sweet and pure and automatically supply it to a trough from a closed reservoir or receptacle as fast as it is consumed by the fowls, and also to keep the feed clean and prevent waste by supplying it automatically to a trough from a closed receptacle as fast as it is consumed, and to warm the water and feed during cold weather and remove all danger of freezing of the water, and also to warm the poultry-house during cold weather. These and other objects are attained by a device of improved construction provided with a water receptacle and trough and a feed receptacle and trough and means for heating the water and feed, which I will now particularly describe, referring to the accompanying drawings, in which—

Figure 1 is an end elevation of a poultry feeder and waterer embodying my invention. Fig. 2 is a plan view of the same. Fig. 3 is a longitudinal vertical section of the same.

The device is preferably made throughout of sheet metal and as shown comprises mainly a cylindrical casing *a*, partly surrounded by a jacket-casing *b*. The cylindrical casing *a* is divided by a partition *c* into two compartments. The upper compartment of the cylindrical casing is the water-receptacle, and the receptacle formed between the jacket-casing *b* and the cylindrical casing *a* is the feed-receptacle.

The bottom of the water-receptacle has an upwardly-extending recess formed therein, and to this end the partition *c* has its central portion raised a considerable distance above the outer margin, the raised portion being shown as connected with the lower portion by cylindrical walls. From the raised portion of the partition *c* to the top of water-receptacle heating-tubes *d* extend through the water-receptacle, and these tubes, according to my invention, are inclined upwardly and inwardly, at their lower ends being near the outer periphery of the top of the recess or raised central portion of the partition *c*, and therefore quite widely separated on radial lines, and at their upper ends being grouped closely together. This construction insures reflection of the heated gases by the unperforated portion of the partition *c*, directly over the source of heat, to be hereinafter described, and an application of the heat at widely-separated points through the mass of liquid above this partition, as well as a large heating-surface in proportion to the total area of draft, and insures that no gases sufficiently hot to injure a fowl shall escape from the top of the apparatus. The number of tubes shown (three) has given excellent results in practice, but may of course be departed from in some instances. A wall *e* is formed around the upper ends of these tubes to exclude from the tubes any water which may overflow on the top of the casing during the filling of the water-receptacle. Provision is made for the filling of the water-receptacle by a suitable opening formed in the top of the casing *a* and closed by a removable air-tight plug, shown as a screw-plug *f*.

A watering-trough *g* is shown as formed at one end of the casing *a*, and this trough receives its water from the water-receptacle through a passage or conduit connecting the trough and receptacle and extending from near the bottom of the water-receptacle and terminating below the top of the trough. This passage or conduit is shown as formed by the tube *h*, which is secured at its lower end to the casing *a* and opens into the watering-trough *g* below the top of the trough and extends upward in the water-receptacle to a plane slightly above the top of the raised portion of the partition *c*. As the receptacle has no other outlet than this tube *h* and is otherwise air-tight the water can only escape into the watering-trough *g*, as the lowering of the level of the water in the trough permits air to enter the receptacle through the tube *h*, and the entrance of air through this tube into the receptacle will permit the escape of a corresponding quantity of water through the tube into the trough, and this will be continued until the normal level of water in the trough is attained, and thus a predetermined level of water in the watering-trough $g$ is constantly and automatically maintained so long as there is sufficient water in the receptacle to cover the upper end of the tube $h$. The location of this upper end of the tube $h$ above the raised portion of the partition $c$, as above described, insures that this partition will at all times be covered with water, and therefore prevents high heating of the partition and permits the use of soldered joints between the pipes $d$ and the partition and between different parts of the partition without fear of melting of the solder, and in any construction will prevent undue expansion and consequent leakage. The tube $h$ may be temporarily closed by a cork or stopper whenever the plug $f$ is to be removed.

The feed-receptacle between the jacket-casing $b$ and the cylindrical casing $a$ is shown as provided with a removable lid or cover $i$, permitting access to the receptacle when desired, as for renewing the supply of feed and for cleaning the feed-receptacle. At the lower end of the feed-receptacle is formed a feed-trough $j$, and the bottom and side walls of the feed-receptacle are inclined, so as to direct all the feed into the feed-trough, and the opening or passage from the feed-receptacle to the feed-trough terminates below the top of the feed-trough, so that the feed will not overflow above the sides of the trough, but will be automatically fed downward into the trough as the feed in the trough is removed to maintain a practically constant supply of feed in the trough.

The means for heating (shown) comprises an oil-fount $k$, a burner $l$, and a chimney $m$, and the chimney extends up into the recess in the bottom of the water-receptacle, so that the heated air and products of combustion will flow into this recess and upward through the heating-pipes $d$. This construction also permits the use of a chimney of sufficient height to insure a proper draft and an effective combustion at the burner. The location of the heating-tubes $d$, with their lower ends near the outer periphery of the recess, as above described, brings the tubes out of line with the chimney, so that back drafts down these tubes will not extinguish the lamp, and so that the unperforated portion of the partition directly over the chimney will reflect the heated gases and diffuse them about the recess before these gases pass upward and outward through the tubes $d$. To prevent undue heating of the oil in the oil-fount $k$, an open-top water-reservoir is formed at the top of the oil-fount, as shown, and the filling-opening $k'$ of the oil-fount is in a tube extending above the water-reservoir. As the water in this reservoir remains at rest and any heated portions would remain at its upper surface this water-reservoir forms an effective shield between the burner and the oil-fount. This construction is important for several reasons.

The lamp in this device must be thoroughly inclosed, as shown, so that the fowls will not come in contact with it or with any highly-heated parts, and the construction of heating chamber and tubes, as above described, results in the retention of heated gases above the oil-fount and the high heating of parts above the oil-fount. The open-top water-reservoir effectively prevents the heating of the oil in the oil-fount under these conditions, and makes the device safe, so that it may be left in unguarded poultry-houses without fear of explosion or fire. Draft-openings $a'$ are shown as formed in the casing $a$, near the bottom thereof, and any suitable provision may be made for allowing the inflow of sufficient air to properly maintain the combustion at the burner.

The casing $a$ is shown as provided with handles $a^2$ $a^2$, and the cover $i$ of the feed-receptacle is also shown as provided with handles $i'$ $i'$, all for convenience in manipulation or handling. Access to the lamp may be readily had by lifting the casing, and, as shown, the lower compartment of the casing has no bottom piece.

In some uses of the invention the feed heating and supplying part of the apparatus may not be desired, and therefore the feed jacket and trough would be omitted, but the construction need not be otherwise altered in such cases.

In use the device will require attention only at comparatively long intervals, as it may be constructed to hold sufficient water and feed for one week or for longer or shorter periods, as desired; and as a comparatively small burner may be used the oil-fount may readily be made of sufficient capacity to require replenishment of the oil-supply only at corresponding intervals. The heat of the burner is so effectively and continually applied in my improved apparatus that a very small flame will do the required work, and therefore the expense of the device in oil-consumption will be slight. No high degree of heating is desired; but with a small flame the water will be maintained at a temperate heat or warmth even in the coldest weather, and the feed will also be moderately warmed by radiation from the warm water, and sufficient heat will be radiated into the surrounding air to slightly warm the poultry-house, while there will be no danger of injury to the fowls, as the flame and the hottest parts of the device will be effectively shielded within the apparatus.

The warmth of the water and feed is particularly desirable in cold weather, as is also the warming of the poultry-houses, insuring that the fowls will eat and drink in at least normal quantities and will perform their usual functions. The usual constant attention required during cold weather to prevent freezing of water in the poultry-houses will be entirely obviated by the use of my improved waterer and feeder. During warm weather the lamp will not usually be lighted, but all other functions except the heating function of the device will be effectively performed.

It is evident that modifications may be made in the construction shown and particularly described and parts of my invention may be separately used.

What I claim, and desire to secure by Letters Patent, is—

1. A feeding and watering device comprising a water-receptacle, and a feed-receptacle forming a jacket about the water-receptacle, a watering-trough connected to the water-receptacle, and a feed-trough near the bottom of the feed-receptacle and connected therewith and means for directly heating the water in the water-receptacle, said water-receptacle intervening between the feed-receptacle and the heating means, substantially as described.

2. A feeding and watering device comprising a casing and a jacket about the same, the casing being divided by a partition into two compartments, one above the other, the upper compartment forming a water-receptacle closed and air-tight except at a single outlet, and the lower compartment being open for the admission of air, said partition having a raised central portion forming an upwardly-extending recess in the bottom of the water-receptacle, and the jacket forming a feed-receptacle, a watering-trough, the upper compartment and watering-trough being connected by a conduit which forms said single outlet from said upper compartment and extends from near the bottom of said upper compartment and terminates below the top of the watering-trough, heating-tubes extending through the upper compartment from the raised portion of the partition to the top of the water-receptacle, and a feed-trough near the bottom of the feed-jacket and connected therewith, and a burner and chimney in the lower compartment, said chimney extending up into said recess, substantially as set forth.

3. In a watering device, in combination, a casing $a$, a partition $c$ having a raised central portion and dividing the casing into two compartments, one above the other, the upper compartment forming the water-receptacle and being closed and air-tight except at a single outlet near the lower end thereof, and the lower compartment being open to the air, heating-tubes $d$ inclined inwardly and upwardly and extending from near the outer periphery to the raised central portion of the partition $c$ to the top of the casing, a wall $e$ around the upper ends of the tubes $d$, a removable air-tight plug closing an opening in the top of the water-receptacle, the water-trough $g$, outside the casing $h$, the tube $h$ connecting the water-receptacle and water-trough and terminating in the receptacle slightly above the raised central portion of the partition and opening into the watering-trough below the top thereof and forming said single outlet of the water-receptacle, and an oil-fount, burner and chimney in said lower compartment, said chimney extending up into the recess formed by the raised portion of the partition $c$, substantially as set forth.

4. In a watering and feeding device, in combination, a casing $a$, a partition $c$ having a central raised portion and dividing the casing into two compartments one above the other, the upper compartment being closed and air-tight except at a single outlet, and the lower compartment being open to the air, heating-tubes $d$ inclined inwardly and upwardly and extending from the raised central portion of the partition $c$ to the top of the casing, a wall $e$ around the upper ends of the tubes $d$, a removable air-tight plug $f$ closing an opening in the top of the casing $a$, the watering-trough $g$ formed outside of the casing $a$, the tube $h$ connecting the upper compartment of the casing and the watering-trough and terminating in the receptacle slightly above the raised central portion of the partition $c$ and opening into the watering-trough below the top thereof and forming said single outlet of the water-receptacle, the jacket-casing $b$, the cover $i$, the feed-trough $j$, an oil-fount, burner and chimney in said lower compartment of the casing $a$, and a water-reservoir covering said oil-fount, substantially as set forth.

This specification signed and witnessed this 15th day of January, 1896.

S. D. STRONG.

In presence of—
F. E. STRONG,
L. B. TOMPKINS.